United States Patent
Senda et al.

(10) Patent No.: US 7,460,928 B2
(45) Date of Patent: Dec. 2, 2008

(54) SETUP INFORMATION DISPLAY DEVICE AND METHOD FOR PROCESSING MACHINE

(75) Inventors: Takashi Senda, Inuyama (JP); Makoto Totsugi, Inuyama (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 0 days.

(21) Appl. No.: 11/594,104

(22) Filed: Nov. 8, 2006

(65) Prior Publication Data

US 2007/0124017 A1 May 31, 2007

(30) Foreign Application Priority Data

Nov. 28, 2005 (JP) ............................. 2005-341894

(51) Int. Cl.
*G06F 19/00* (2006.01)
(52) U.S. Cl. ..................... 700/180; 700/179; 700/181; 700/182
(58) Field of Classification Search .......... 700/179–182
See application file for complete search history.

(56) References Cited

U.S. PATENT DOCUMENTS 6,219,586 B1 * 4/2001 Sakai .......................... 700/182
7,010,386 B2 * 3/2006 McDonnell et al. .......... 700/175
2003/0088534 A1 * 5/2003 Kalantar et al. ............... 706/50

FOREIGN PATENT DOCUMENTS

JP 9-212221 A 8/1997

* cited by examiner

*Primary Examiner*—Michael D Masinick
(74) *Attorney, Agent, or Firm*—Westerman, Hattori, Daniels & Adrian, LLP.

(57) ABSTRACT

The present invention provides a setup information display device for a processing machine which enables required setup information to be easily displayed. The present invention is applied to a multi-turret type punch press or the like. A setup information display device is used for a processing machine 1 in which a plurality of tools 7 can be installed. The device includes information generating means 48 for generating setup information on the basis of a processing schedule SH and information on the tools 7 installed in the processing machine 1. The device also includes display information generating means 71 for generating information to be displayed in an information display section 47a of a display device 47. The display information generating means 71 generates, in the information display section 47a, a setup information display 81 that shows the setup information and a guide display 82 that prompts an operator to perform an operation required to show the setup information display 81.

4 Claims, 7 Drawing Sheets

SETUP INFORMATION DISPLAY DEVICE AND METHOD FOR PROCESSING MACHINE

FIELD OF THE INVENTION

The present invention relates to a setup information display device and method for a processing machine such as a punch press in which a plurality of tools can be installed, the setup information display device and method displaying tool change setup information.

BACKGROUND OF THE INVENTION

In some processing machines having tool magazines on which a plurality of tools can be installed, for example, punch presses using turrets as tool magazines, tools installed on the tool magazines are changed in accordance with the contents of processing. For example, in some multi-turret punch presses using turret type tools in each of which a plurality of unit tools are mounted, scheduled operation is performed by frequently changing the turret type tools installed on the tool magazines.

For a processing machine in which tools are changed and reinstalled as described above, the tools need to be efficiently changed as a processing schedule progresses. It is thus convenient to create tool change setup information and to perform a setup operation in accordance with the setup information.

Conventional punch presses using turret type tools as described above display only the tool numbers of the tools currently installed on the tool magazines of the processing machine, on an operation panel of an NC device. These punch presses do not display any setup information. The setup information is provided to operators through, for example, a list on a document or a white board.

It is difficult for the operators to understand the contents of the setup information by viewing the list on the document or the like, and extra effort is also required to understand the contents. Further, the contents are likely to be misunderstood. Thus, a long time is required to determine the next tools to be set up during a scheduled operation. This results in an inefficient setup operation. Furthermore, the setup operation may be inappropriately performed.

An object of the present invention is to provide a setup information display device for a processing machine which enables required setup information to be easily displayed. Another object of the present invention is to allow the urgency of a setup operation to be easily determined. Yet another object of the present invention is to allow required contents to be clearly displayed and to enable the display contents to be switched easily and quickly.

SUMMARY OF THE INVENTION

The configuration of the present invention will be described with reference to FIG. 1 corresponding to an embodiment. A setup information display device is used for a processing machine 1 in which a plurality of tools 7 can be installed. The setup information display device comprises setup information generating means 48 for generating setup information on the basis of a processing schedule SH and information F2 on the tools 7 installed in the processing machine 1, and display information generating means 71 for generating information to be displayed in an information display section 47a of a display device 47. The display information generating means 71 generates, in the information display section 47a, a setup information display 81 that shows the setup information, and a guide display 82 that prompts an operator to perform an operation required to show the setup information display 81.

With this configuration, the display information generating means 71 generates display information in accordance with the setup information, and the setup information display 81 and the guide display 82 are provided in the information display section 47a of the display device 47. The setup information may involve detailed contents such as the types and sizes of the tools 7. Accordingly, the setup information simply listed in the information display section 47a is complicated and difficult to understand. The present invention provides the above guide display 82 so that the operator can view the guide display 82 to instruct the required setup information display 81 to appear. This makes it possible to minimize extra displays to enable the required setup information 81 to be easily displayed.

According to the present invention, the display information generating means 71 may show marks 83 indicative of tools 7 that need to be set up, as the guide display 82, and the marks 83 indicative of the tools 7 may be classified for display according to urgency of the setup in the setup information. In this manner, the marks 83 indicative of the tools 7 are used as the guide display 82 and classified for display according to the urgency of the setup. This enables the operator to easily determine the urgency of the setup.

Further, where the marks 83 indicative of the tools 7 are used and classified for display according to the urgency of the setup, the display information generating means 71 may simultaneously show up to a predetermined maximum number of marks 83 indicative of tools 7, as the guide display 82, and tools 7 corresponding to an excess of the predetermined maximum number may be displayed as the number of tools 7 that need to be set up decreases as a result of execution of the setup. Further, the information display section 47a of the display device 47 may be covered with a touch panel that allows information corresponding to a position touched with a human finger to be input. Where up to the predetermined maximum number of marks 83 indicative of the tools 7 are displayed as the guide display 82, the display contents are clear and easier to understand. In this case, the tools 7 corresponding to an excess of the predetermined maximum number are displayed as the number of tools 7 that need to be set up decreases as a result of execution of the setup. Consequently, the guide display 82 can be shown for all the tools that need to be set up. Furthermore, where the information display section 47a is covered with a touch panel, an operation can be performed simply by touching an appropriate position on the display. This allows the display contents to be switched easily and quickly.

The present invention provides the setup information display device for the processing machine in which the plurality of tools can be installed, the device comprising the information generating means for generating setup information on the basis of a processing schedule and information on the tools installed in the processing machine, and the display information generating means for generating information to be displayed in the information display section of the display device. The display information generating means generates, in the information display section, the setup information display that shows the setup information and the guide display that prompts the operator to perform an operation required to show the setup information display. This enables the required setup information to be easily displayed. Where the display information generating means shows the marks indicative of tools that need to be set up, as the guide display, and the marks indicative of the tools are classified for display according to urgency of the setup in the setup information, then the urgency of the setup can be easily determined. Where the display information generating means simultaneously shows up to the predetermined maximum number of marks indicative of tools, as the guide display, and the tools corresponding to an excess of the predetermined maximum number are displayed as the number of tools that need to be set up decreases as a result of execution of the setup, and where the information display section is covered with a touch panel that allows information corresponding to a position touched with a human finger to be input, then the display contents are clear and all the required displays can be provided. Moreover, the display contents can be switched easily and quickly.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
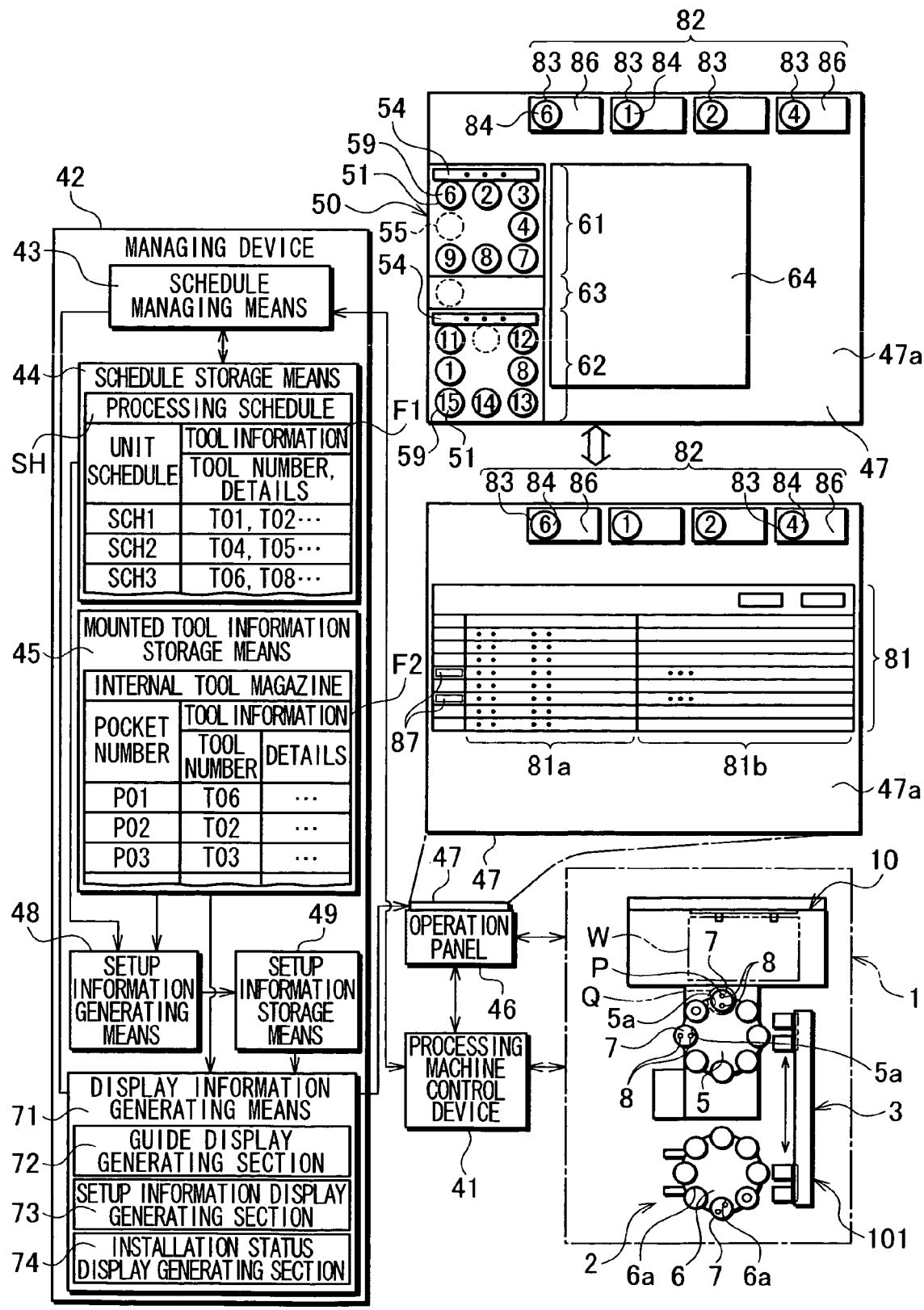
FIG. 1 is a block diagram showing the conceptual configuration of a setup information display device for a processing machine according to a first embodiment of the present invention.

A first embodiment of the present invention will be described with reference to FIGS. 1 to 7. FIG. 1 shows the conceptual configuration of a processing facility comprising an information display device according to the first embodiment. The processing facility comprises a processing machine 101, a processing machine control device 41 that controls the processing machine 101, an operation panel 46 that allows the processing machine control device 41 and the processing machine 101 to be directly operated, and a managing device 42. The setup information display device according to the present embodiment provides, on a screen of a display device 47 of the operation panel 46, a setup information display 81, a guide display 82 that allows the setup information display 81 to be appear, and the like. An information display section 47a comprising the screen of the display device 47 is covered with a touch panel (not shown in the drawings) that enables information corresponding to a position touched with the human finger to be input.

Figure 5:
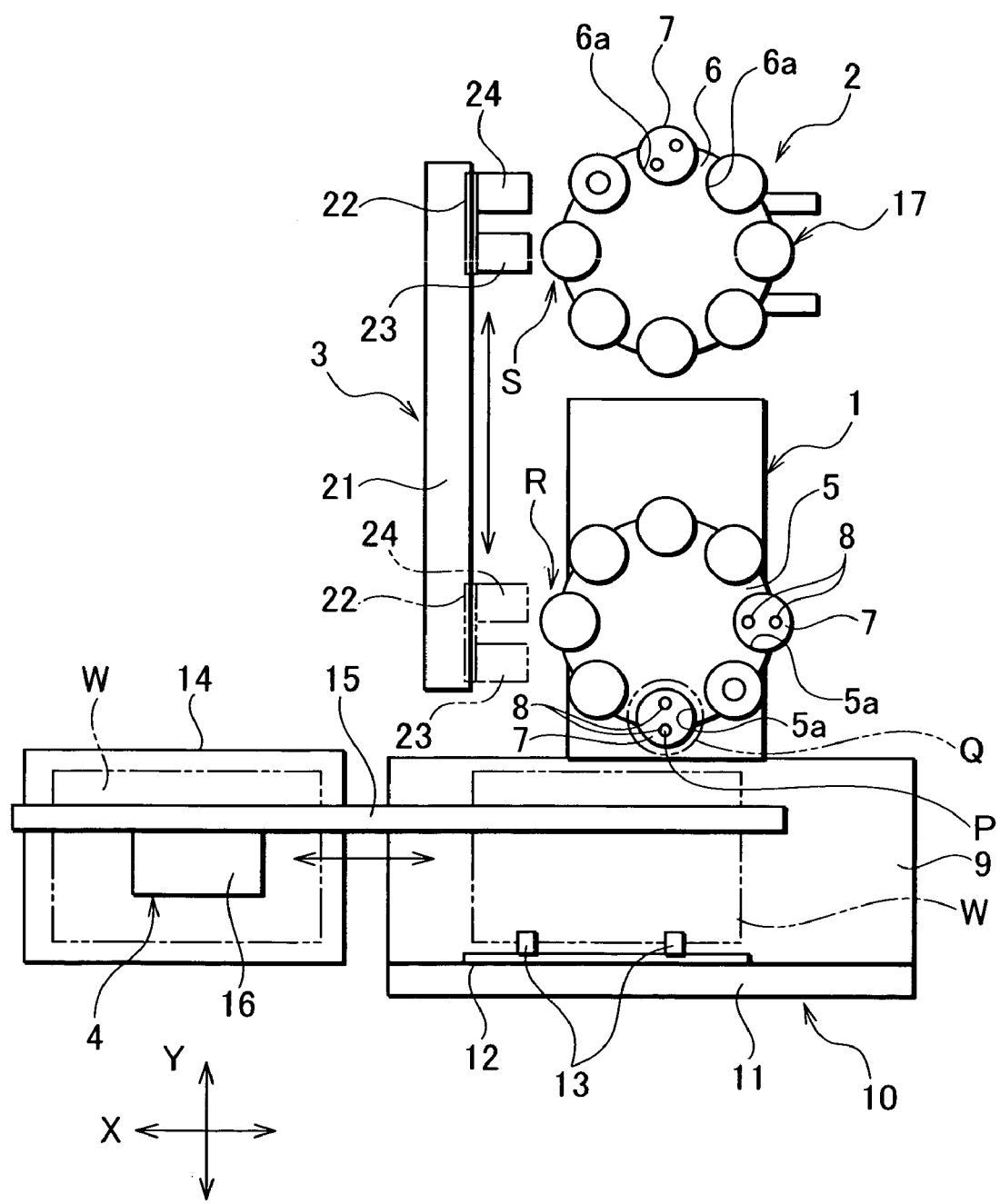
FIG. 5 is a plan view showing an example of a processing machine to which the setup information display device is applied.

The present embodiment is applied to the processing machine 101 mainly comprising a punch press 1 configured as described below. As shown in FIG. 5, the processing machine 101 comprises a punch press 1, a presetter 2, a tool changer 3, and a loader 4. The punch press 1 comprises an internal tool magazine 5 on which a plurality of turret type tools 7 are changeably installed; individual tools 8 are mounted on each of the turret type tools 7. The tool changer 3 is a device that automatically changes the turret type tools 7 between the internal tool magazine 5 provided in the punch press 1 and an external tool magazine 6 provided in the presetter 2, respectively.

Figure 7:
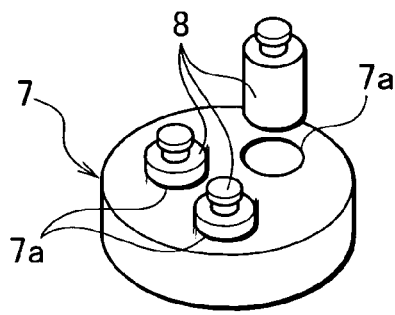
FIG. 7 is a perspective view showing turret type tools.

As shown in FIG. 7, the turret type tool 7 has a circular planar shape, and one or more individual tools 8 are mounted on each turret type tool 7. Each of the individual tools 8 is changeably mounted in an individual tool supporting portion 7a, comprising a through-hole or the like, formed in the turret type tool 7. The individual tool 8 is a punch tool or a die tool, and the punch tool and the die tool are used in a vertical pair, and each turret type tool 7 is a punch tool or a die tool constituting a vertical pair. The figure shows only the turret type tools 7 for punch tools, with the turret type tools 7 for die tools omitted.

Figure 6:
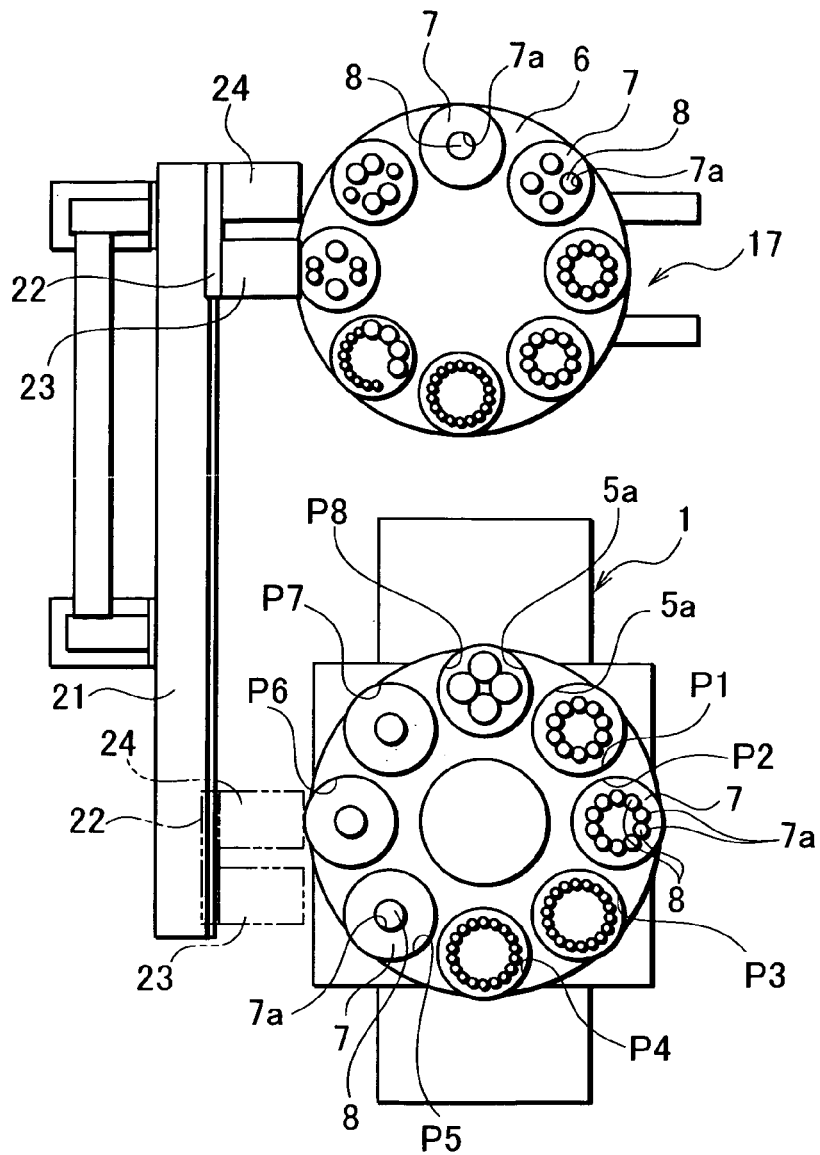
FIG. 6 is an enlarged plan view showing an internal tool magazine, an external tool magazine, and a tool changer.

The individual tools 8 vary in the shape and size of a hole to be punched, and the individual tools 8 intended for different hole shapes and sizes are mounted in the plurality of individual tool supporting portions 7a, formed in the turret type tool 7. Plural types of the turret type tools 7 are prepared, in which numbers, arrangements, sizes and so on of the individual tool supporting portions 7a are different as shown in FIG. 6. Plural types of individual tools 8 with a compatible outer diameter dimension can be mounted in the same individual tool supporting portion 7a. Arbitrary fittable individual tools 8 are mounted in the individual tool supporting portions 7a of the different types of turret type tools 7 to excute the individual tool oraganization of the turret type tools 7.

The internal tool magazine 5 is rotatable in a horizontal direction, and pockets 5a are formed in an outer peripheral part of the internal tool magazine 5 at plurality of positions in a circumferential direction; the pockets 5a removably hold the turret type tools 7. The pockets 5a are identified by pocket numbers P01 to P08 for control. The internal tool magazine 5 comprises a vertical pair of concentric components that rotate holding the punch-side turret type tools 7 and the die-side turret type tools 7, respectively. The figure shows only the upper internal tool magazine 5.

In FIG. 5, the punch press 1 serves as a tool indexing mechanism and has a magazine indexing portion and a tool holder indexing portion (neither of them are shown in the drawings). The magazine indexing portion is a mechanism that rotates the internal tool magazine 5 so that an arbitrary pocket 5a on the internal tool magazine 5 aligns with a press head position Q. The tool holder indexing portion holds the turret type tool 7 located at the press head position Q and rotates this turret type tool 7 around the center of the tool holder. This allows an arbitrary individual tool 8 on the turret type tool 7 to be indexed to a predetermined punch position P. The individual tool 8 indexed to the punch position P is elevated or lowered for punch processing via a ram that can be elevated or lowered by a punch driving source such as a servo motor.

The punch press 1 has a plate material feeding mechanism 10 that moves a plate material W on a table 9 in two orthogonal directions (X axis and Y axis). The plate material feeding mechanism 10 moves to move an area of the plate material W to be processed, to the punch position P. The plate material feeding mechanism 10 has a carriage 11 that moves forward and backward along the Y axis and on which a cross slide 12 is mounted so as to be movable forward and backward along the X axis, and a plurality of work holders 13 are attached to the cross slide 12 to grip an end of the plate material W.

The loader 4 is a device that grips, by means of suction or the like, each of the plate materials W stacked on a predetermined plate material placing portion 14, to feed the plate material W onto the table 9 of the punch press 1. The loader 4 comprises a suction pad, that grips the plate material W, (not shown in the drawings) on a traveling member 16 that travels on an erection rail 15.

The presetter 2 is installed so that it can rotate and index the external tool magazine 6, and the presetter 2 is installed behind the punch press 1. The presetter 2 is provided with a setup changing portion 17 that allows the operator to change the turret type tools 7 on the external tool magazine 6. The external tool magazine 6 is rotatable in the horizontal direction similarly to the internal tool magazine 5, and pockets 6a are formed in an outer peripheral part of the external tool magazine 6 at plurality of positions in a circumferential direction; the pockets 6a removably hold the turret type tools 7. The external tool magazine 6 comprises two components which are concentrically installed in the vertical direction and which are used for the punch tool-mounted turret type tools 7 and for the die tool-mounted turret type tools 7, respectively, and magazine indexing means (not shown in the drawings) carries out driving for rotation and indexation.

The tool changer 3 is a device that changes the turret type tools 7 between the internal tool magazine 5 on the punch press 1 and the external tool magazine 6 on the presetter 2. The turret type tools 7 are changed at the prescribed change indexing position R on the internal tool magazine 5 and the prescribed change indexing position S on the external tool magazine 6, respectively. The tool changer 3 comprises a guide rail 21 that extends between the change indexing position R on the internal tool magazine 5 and the change indexing position S on the external tool magazine 6, and a traveling member 22 that travels along the guide rail 21. The traveling member 22 is provided with two chucks 23, 24 arranged in a traveling direction to hold the respective turret type tools 7. One of the chucks 23, 24 holds a turret type tool 7 to be changed, and the other empty chuck 23 or 24 receives a turret type tool 7 from the internal tool magazine 5 or the external tool magazine 6. The first chuck 24, 23 delivers the held target turret type tool 7 to the internal tool magazine 5 or the external tool magazine 6. This enables the turret type tools 7 to be changed by a single traveling operation of the traveling member 22 between the internal tool magazine 5 and the external tool magazine 6.

The turret type tools 7 can be changed by a single traveling operation when the traveling member 22 has the single chuck 23 or 24 and when the turret type tool 7 to be changed is temporarily placed on a temporary placement table (not shown in the drawings) provided near each of the change indexing positions R, S. Like the internal tool magazine 5 and the external tool magazine 6, the chucks 23, 24, provided on the traveling member 22, are used for the punch tool-mounted turret type tools 7 and for the die tool-mounted turret type tools 7, respectively, and arranged in parallel in the vertical direction.

A control system and information display will be described. In FIG. 1, the processing machine control device 41 is a computerized device that controls the processing machine 101 in accordance with programs. The processing machine control device 41 comprises a numerical control device that controls the punch press 1 in the processing machine 101, a changer control device that controls the tool changer 3, a loader control device that controls the loader 4 (none of them are shown in the drawings) and so on.

The managing device 42 is a computer that manages schedules for scheduled operations and generates setup information. The managing device 42 is composed of a part or the whole of the processing machine control device 41 or the managing device 42 is provided independently of the processing machine control device 41. The managing device 41 has schedule managing means 43, schedule storage means 44, mounted tool information storage means 45, setup information creating means 48, setup information storage means 49, and display information generating means 71. The managing device 41 may have schedule creating means (not shown in the drawings).

The schedule storage means 44 stores a processing schedule SH. The processing schedule SH includes a plurality of unit schedules Sch (Sch1 to Schn (n is an arbitrary natural number) each containing tool information F1 for processing. The unit schedule Sch is a schedule corresponding to one execution of one processing program (not shown in the drawings).

The tool information F1 contains the tool numbers (T01, T02, . . . ) of the turret type tools 7 for processing and detailed information indicating what individual tool 8 is installed in each individual tool supporting portion 7a of the turret type tool 7 with a certain tool number.

The schedule managing means 43 allows the processing machine control device 41 to execute a processing program in accordance with the processing schedule SH stored in the schedule storage means 44. The schedule managing means 43 thus manages the progress of the processing.

The mounted tool information storage means 45 stores information F2 on the turret type tools 7 installed on the internal tool magazine 5 and external tool magazine 6. Specifically, the tool information F2 in the mounted tool information storage means 45 includes, for each of the pocket numbers (P01, P02, . . . ) identifying the pocket 5a on the internal tool magazine 5 and the pocket 6a on the external tool magazine 6, information on the tool number (T01, T02, . . . ) of the turret type tool 7 installed in that pocket 5a or 6a, identified by the pocket number, and detailed information indicating what individual tool 8 is installed in each individual tool supporting portion 7a of the turret type tool 7 with that tool number. The pocket numbers (P01, P02, . . . ) are provided for each of the internal tool magazine 5 and external tool magazine 6. The mounted tool information storage means 45 also stores information on the tool numbers of the turret type tools 7 held on the tool changer 3. Where any turret type tool 7 installed in the internal tool magazine 5 or external tool magazine 6 has its installed position changed or is removed, the mounted tool information storage means 45 automatically changes the storage contents in response to the operator's operation.

The setup information generating means 48 generates setup information on the basis of the processing schedule SH and the information on the turret type tools 7 installed in the processing machine 1. The setup information created is stored in the setup information storage means 49. Specifically, the setup information generating means 48 compares the processing schedule SH stored in the schedule storage means 44 with the storage contents of the mounted tool information storage means 45, and generate the setup information.

The setup information specifies what turret type tool 7 is to be carried into or out of the processing machine 1 until which unit schedule Sch or during which unit schedules. The setup information includes the detailed information indicating what individual tool 8 is installed in each individual tool supporting portion 7a of the turret type tool 7.

The display information generating means 71 generates information to be displayed in the information display section 47a, comprising the screen of the display device 47, in accordance with the storage contents of the setup information storage means 49 or the storage contents of the setup information storage means 49 and mounted tool information storage means 45. The display information generating means 71 allows a setup information display 81 and a guide display 82 to be shown in the information display section 47a. The display information generating means 71 further allows an installation status display 50 to be shown in the information display section 47a. The displays 81, 82, 50 are generated by a guide display generating section 72, a setup information display generating section 73, and an installation status display generating section 74 which are provided in the display information generating means 71.

In the installation status display 50, a tool presence information display 51 shows the arrangement of the pockets on the internal tool magazine 5 and external tool magazine 6 in a pseudo manner using circular marks. In this case, display areas 61, 62 are provided for the internal tool magazine 5 and external tool magazine 6, respectively, and a display area 63 is provided for the tool changer 3, and the tool presence information display 51 is provided for each of the display areas 61 to 63. In the installation status display 50, a pocket corresponding display position at which the tool presence information display 51 is shown is specified for each of the pocket 5a on the internal tool magazine 5 and the pocket 6a on the external tool magazine 6. The pocket corresponding display portions are arranged in accordance with the arrangement of the pockets on the internal tool magazine 5 and external tool magazine 6 in a pseudo manner.

In the installation status display 50, the tool presence information display 51 is shown at those of the pocket corresponding display positions on the internal tool magazine 5 and external tool magazine 6 where the turret type tools 7 are installed. The tool presence information display 51 is not shown at those of the pocket corresponding display positions where no turret type tools 7 are installed. Those of the pocket corresponding display positions where the turret type tools 7 are installed may be displayed against the same background as that of the peripheral parts or provided with position displays 55 indicative of the pocket corresponding display positions. In the present embodiment, circular areas shown by broken lines in the figure are shown with an unnoticeable color that is similar to the background color; the circular areas correspond to the position displays 55 indicative of the pocket corresponding display positions.

The tool presence information display 51 is a circular mark as described above, and an identification number display 59 for the turret type tool 7 is provided in the mark. The identification number is a string such as "T01" comprising a tool number preceded by an initial letter "T" indicating that this is a tool number. However, in the identification number display 59 in the tool presence information display 51, the head letter "T" and the upper digit "0" are omitted, with only the numeric part such as "1" displayed. This is because the identification number display 59 in the tool presence information display 51 obviously indicates a tool number, and because the identification number free from unwanted elements such as the initial letter is easier to see.

The installation status display 50 is shown in a part of the screen, while a tool content display 64 and the guide display 82, described below, are shown in the remaining part of the screen; the tool content display 64 shows the contents of a specified tool presence information display 51.

The guide display 82 prompts the operator to perform an operation required to switch a part of the screen to display the setup information display 81. The guide display 82 shows the mark 83 indicative of the turret type tool 7, for a turret type tool 7 that needs to be set up. The mark 83 is shown as, for example, a circle inside which the identification number display 84 for the turret type tool 7 is provided. As is the case with the identification number display 59 in the tool presence information display 51, the initial letter "T" and upper digit "0" of the tool number are omitted from the identification number display 84, with only the numerical part such as "1" displayed.

Figure 2:
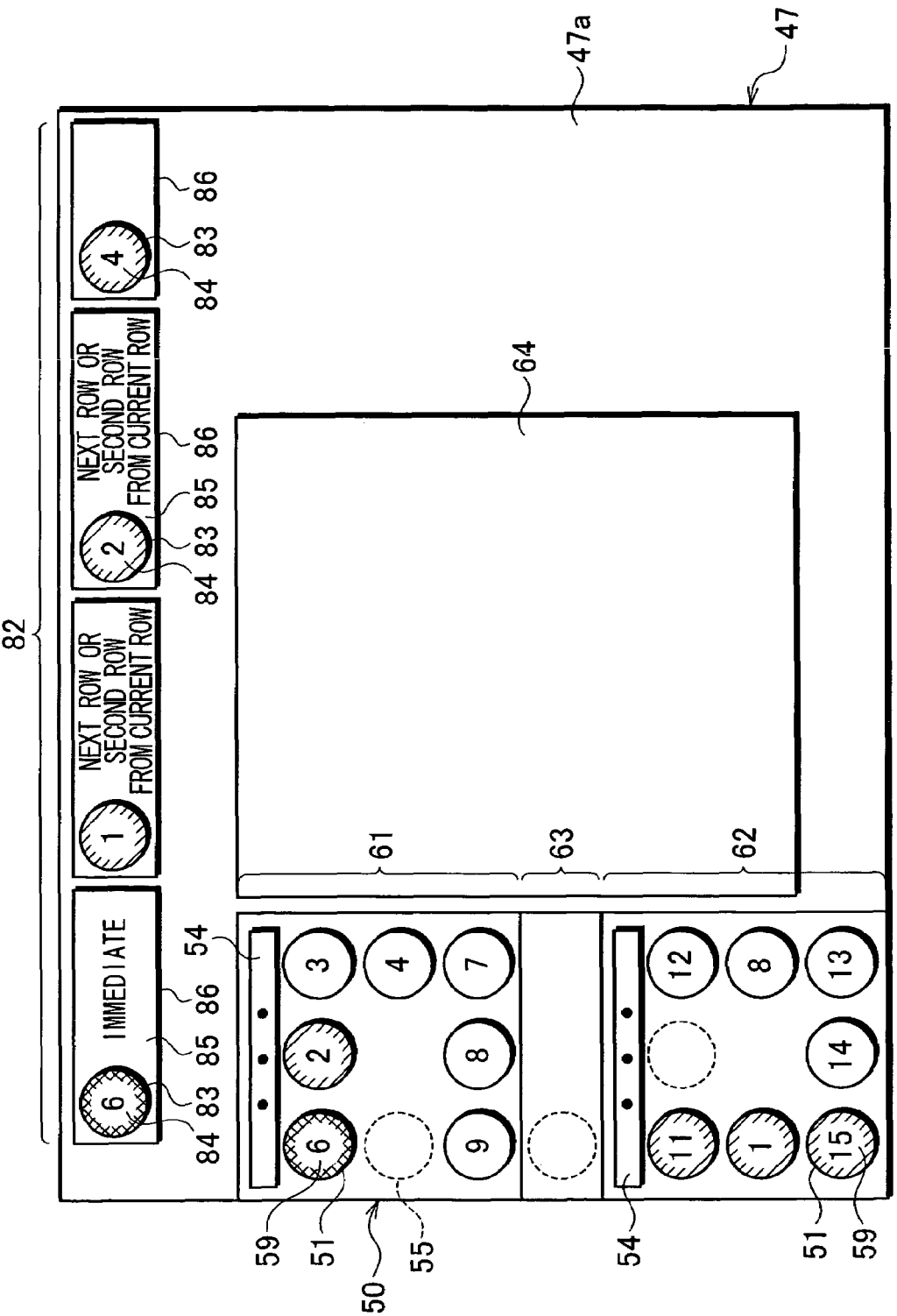
FIG. 2 is a diagram illustrating a screen example and showing how the setup information display device shows a guide display and an installation status display.

In the guide display 82, the marks 83 indicative of the turret type tools 7 are classified for display according to the urgency of setup in the setup information. In FIG. 2, hatching is used to show a difference in color. However, for the classification display, the color of the marks 83 is varied depending on the urgency.

Here, the urgency is classified into three levels. Red is used to show turret type tools 7 with the highest urgency, that is, turret type tools 7 which are in operation or which are required for a processing program for a started unit schedule Sch. In FIG. 2, the cross hatching indicates red. Yellow is used to show turret type tools 7 with the second highest urgency, for example, turret type tools 7 which are required for the processing program in the next row or the second row from the current row (that is, the processing program for the next unit schedule or the second unit schedule from the current unit schedule) and which may currently be changed. In FIG. 2, the one-side inclined hatching indicates yellow. Blue is used to show turret type tools 7 with the lowest urgency, for example, turret type tools 7 which will need to be changed in the future in order to achieve the entire processing schedule S but which cannot currently be changed. In FIG. 2, the dotted hatching indicates blue.

In addition to the distinction by color, a message display 85 containing a text indicating the urgency is shown in according with the urgency, and the circular mark 83 and the message display 85 are enclosed by an enclosure display 86 such as a rectangle for each mark 83. The message display 85 is, for example, "execute immediately" or "execute the next row or the second row from".

The marks 83 are displayed on the screen up to a predetermined maximum number (in the example shown in the drawings, four). Even if more than the predetermined maximum number of turret type tools 7 need to be set up, up to the predetermined maximum number of marks 83 are shown as the guide display 82. Turret type tools 7 which need to be set up and which correspond to an excess of the predetermined maximum number are displayed as the number of turret type tools 7 that need to be set up decreases as a result of execution of setup. The execution of setup is recognized by the display information generating means 71 by monitoring the storage contents of the mounted tool information storage means 45 for a change.

The same colors that indicate the urgency levels in the guide display 82 are used for the tool presence information display 51 for the corresponding turret type tool 7 in the installation status display 50. This color display is processed by the installation status display generating section 74.

The setup information display 81 and the installation status display 50 are selectively displayed on the screen of display device 47. When an arbitrary tool presence information display 51 is specified which is shown in the installation status display 50, the setup information display generating section 73 in FIG. 1 displays, on the screen, the detailed contents of the turret type tool 7 corresponding to the specified tool presence information display 51. The tool presence information display 51 is specified by touching, with the finger, the area on the screen in which that tool presence information display 51 is shown. This allows the selection to be input via the touch panel (not shown in the drawings), covering the surface of the screen.

Figure 3:
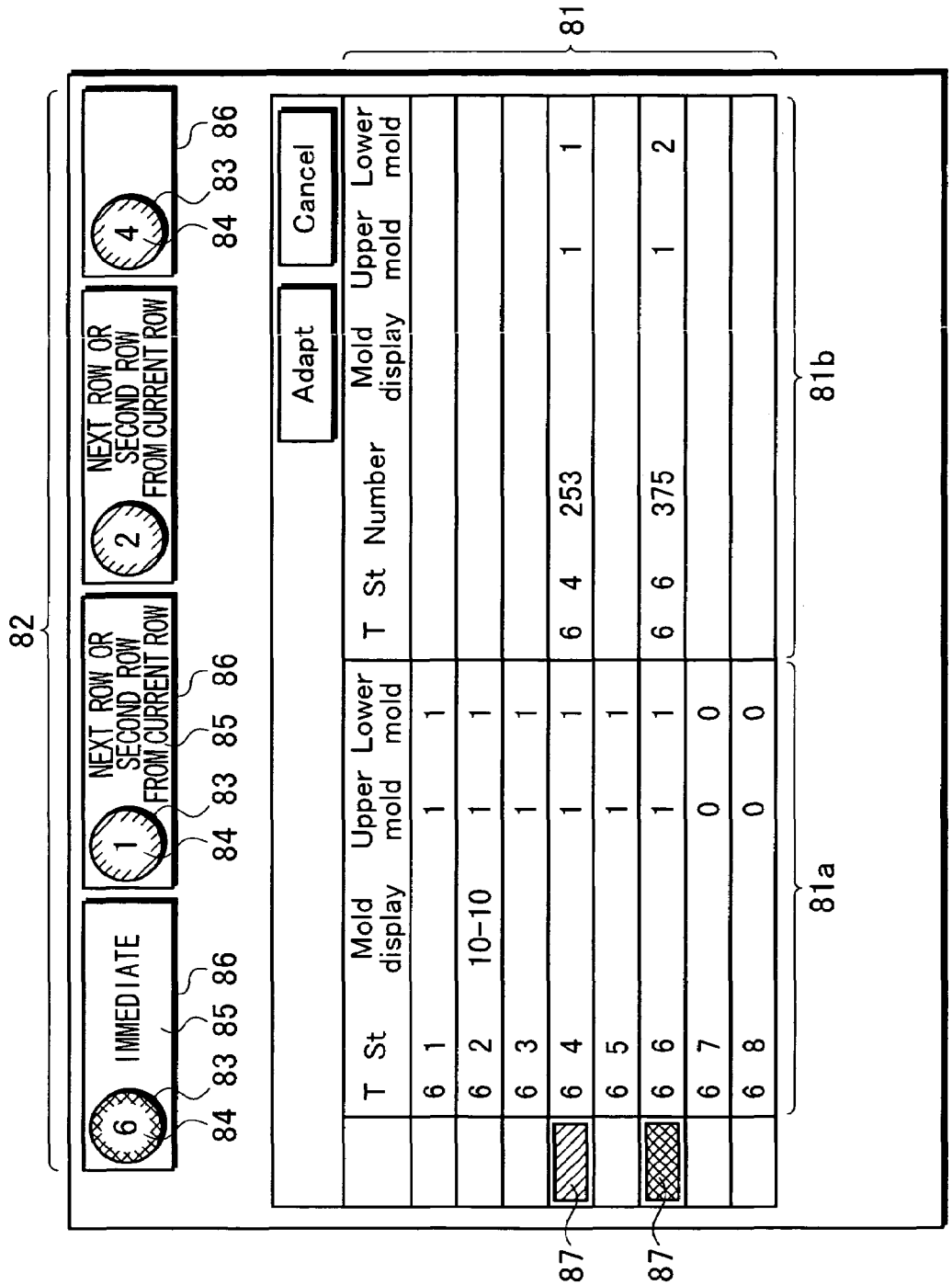
FIG. 3 is a diagram illustrating a screen example and showing how the setup information display device shows a guide display and an installation status display.

FIG. 3 shows a specific example of the setup information display 81. The setup information display 81 in this example is a table showing information on the individual tool supporting portions 7a of the turret type tool 7 in the respective rows. The table has a left column 81a and a right column 81b. The left column 81a shows information on the currently installed individual tools 8, and the right column 81b shows information on the individual tools 8 that need to be set up. The left column 81a and the right column 81b show, in each row, a station number "1" to "8" identifying the individual tool supporting portion 7a, tool information on the size or the like of the individual tool 8, and information on the combination of an upper tool and a lower tool. The upper tool and lower tool combination information identifies the types of an upper tool and a lower tool which are shown with the same individual tool number; plural types of upper tool and lower tool combinations are provided. For example, the types are shown by the number "1" and "2". The setup information display 81 also shows the identification number (in this case, "6") of the turret type tool 7 in all the rows.

The setup information display 81 provides an individual tool setup requirement display 87 at, for example, the head of the row of an individual tool 8 that needs to be set up; the individual tool setup requirement display 87 indicates that this individual tool 8 needs to be set up. The individual tool setup display 87 comprises, for example, the letters "setup" shown in an enclosure display. The individual tool setup requirement display 87 has its color varied in accordance with the urgency similarly to the marks 83 in the guide display 82.

Figure 4:
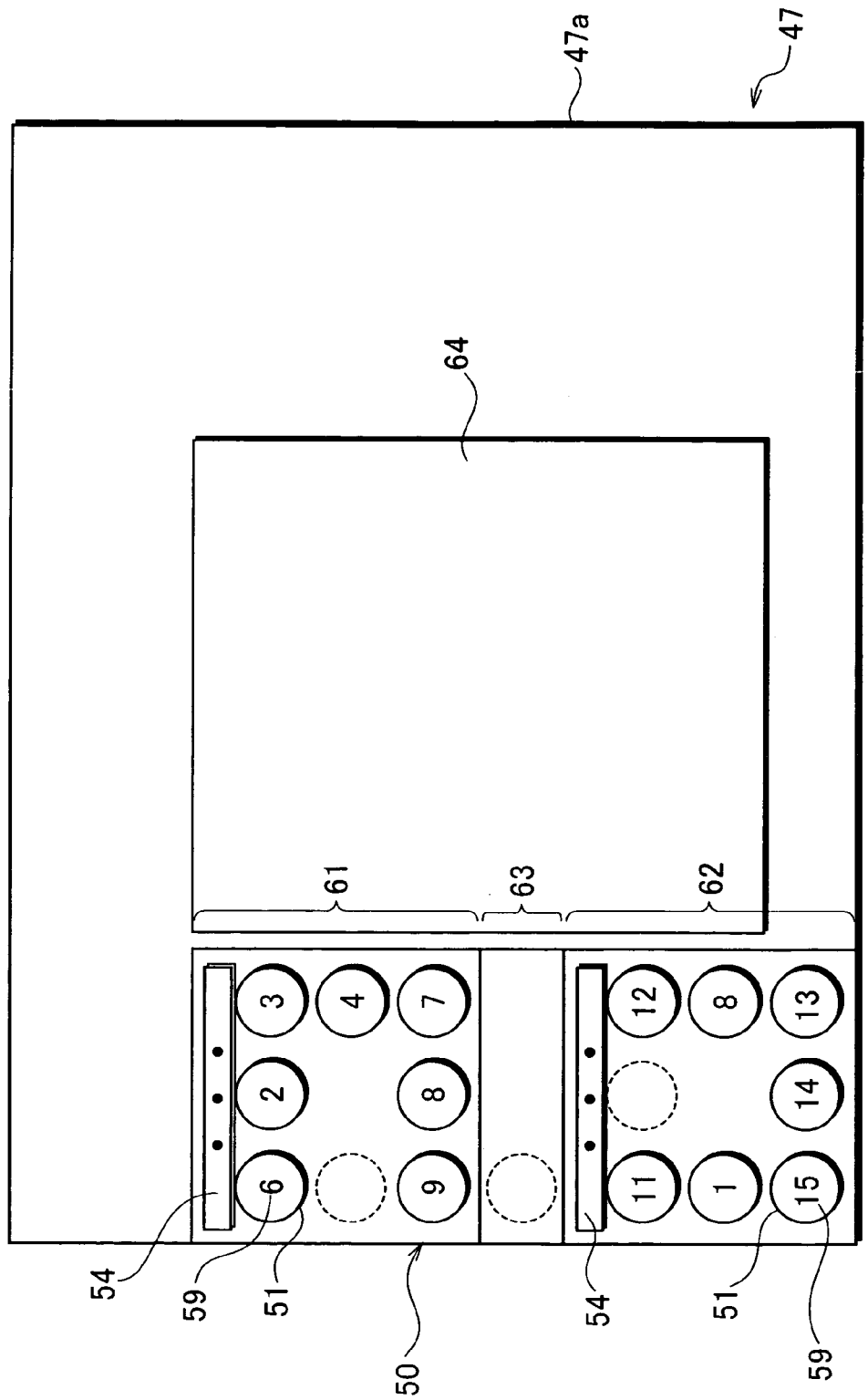
FIG. 4 is a diagram illustrating an example of a screen displayed by the setup information display device if no setup operation needs to be performed.

In the setup information display device configured as described above, the display information generating means 71 generates display information in accordance with the setup information, and the installation status display 50 and the guide display 82 are then shown on the screen of the display device 47 as shown in FIG. 2. The installation status display 50 shows the current installation status of the turret type tools 7 in the processing machine 1 in a pseudo manner. For the turret type tools 7 that need to be set up, the guide display 82 shows the circular marks 83 indicative of these turret type tool 7, and shows the identification number displays 84 of the turret type tools 7 in the respective marks 83. The marks 83 are classified according to the urgency of setup, and the classified urgency levels are shown with the different colors, "red", "yellow", and "blue". Where no setup currently needs to be executed, the guide display 82 is not displayed. FIG. 4 shows a screen example in which no setup needs to be executed. The turret type tools 7 that need to be set up are thus shown in the guide display 82 and classified into the urgency levels. This makes it possible to easily determine which turret type tool 7 currently needs to be set up and at what time that turret type tool 7 is to be set up.

The same colors that indicate the urgency levels in the guide display 82 are used for the tool presence information displays 51 for the corresponding turret type tools 7 in the installation status display 50. Consequently, the installation status display 50, showing the actual tool installation status, allows the easy determination of the pocket number of the turret type tool 7 that needs to be set up.

Touching the tool presence information display 51 in the installation status display 50 with the finger allows the setup information display generating section 73 to execute an appropriate process to cause the setup information display 81 to appear on the screen as shown in FIG. 3. The setup information includes detailed contents such as the types and sizes of the tools.

Accordingly, information on all the turret type tools 7 listed on the screen is complicated and difficult to understand. However, the present embodiment displays the guide display 82 so that the required setup information display 81 can be displayed by viewing the guide display 82 and touching the corresponding part of the installation status display 50 with the finger as described above. This enables extra displays to be minimized, allowing the required setup information to be easily displayed. Further, the setup information display 81 includes the individual tool setup requirement display 87 and the display of the contents after a change to indicate which individual tool 8 in the turret type tool 7 needs to set up. The operator can thus view these displays to easily perform a setup operation.

Up to the predetermined maximum number of marks 83 indicative of the turret type tools 7 are displayed in the guide display 82. This makes the display contents clearer and easier to understand. Turret type tools 7 which need to be set up and which correspond to an excess of the predetermined maximum number are displayed as the number of turret type tools 7 that need to be set up decreases as a result of execution of setup. This allows the guide display 82 to provide all the required displays. Further, the information display section 47a of the display device 47 is covered with the touch panel. Consequently, simply touching the appropriate display area with the finger enables the installation status display 50 to be switched to the setup information display 81. The display contents can thus be switched easily and quickly.

Figure 8:
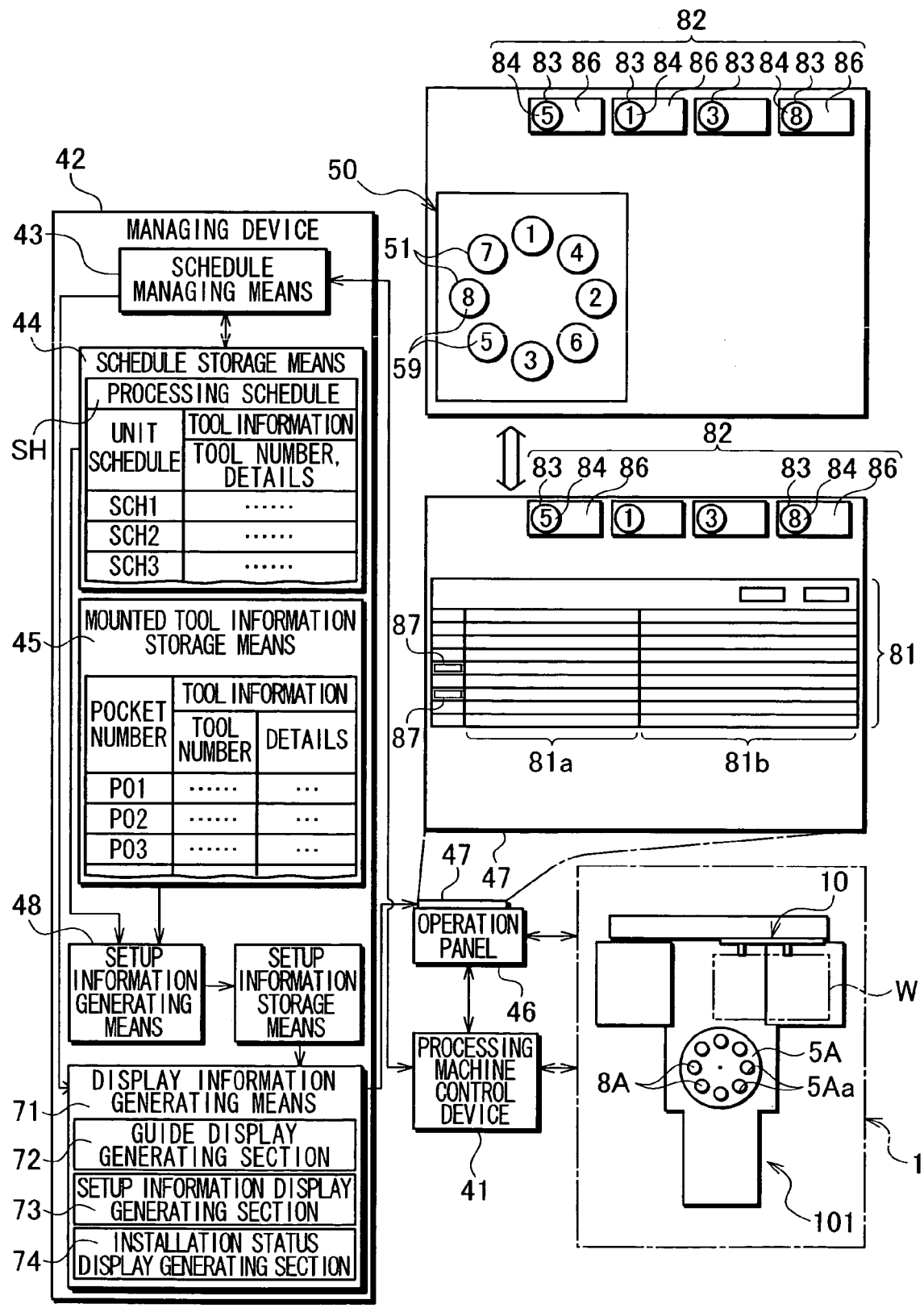
FIG. 8 is a block diagram showing the conceptual configuration of a setup information display device for a processing machine according to another embodiment of the present invention.

FIG. 8 shows another embodiment of the present invention. The present embodiment is applied to the processing machine 101 comprising a turret punch press. In this case, a turret in the processing machine 101 corresponds to a tool magazine 5A. Individual tools 8A are installed in pockets 5Aa on the tool magazine 5A, comprising the turret. Instead of the individual tools 8A, a multi-tool in which a plurality of individual tools are mounted may be installed in the pockets 5A.

Display information generating means 71 generates, in the information display section 47a of the display device 47, the setup information display 81 and the guide display 82, which prompts the operator to perform an operation required to display the setup information display 81. The display information generating means 71 generates information required to show the installation status display 50.

Thus, even if the processing machine 101 is a turret punch press, the guide display 82 is shown which allows the setup information display 81 to be selectively shown. This enables the required setup information to be easily displayed. The other arrangements and effects of the present embodiment are the same as those of the first embodiment.

In the description of the above embodiments, the processing machine 101 is a punch press. However, the present invention is also applicable to a machining center or the like and to general processing machines having tool magazines on which a plurality of tools can be installed.

While the present invention has been described with respect to preferred embodiments thereof, it will be apparent to those skilled in the art that the disclosed invention may be modified in numerous ways and may assume many embodiments other than those specifically set out and described above. Accordingly, it is intented by the appended claims to

The invention claimed is:

1. A setup information display device for a processing machine in which a plurality of tools can be installed, comprising:
    setup information generating means for generating setup information on the basis of a processing schedule and information on the tools installed in the processing machine; and
    display information generating means for generating information to be displayed in an information display section of a display device,
    wherein the display information generating means generates, in the information display section, a guide display that displays types of tools that currently need to be set up and respective urgencies of setup of the tools that currently need to be set up and that prompts an operator to perform an operation required to display the setup information, and
    wherein the display information generating means generates, in response to the operator performing the operation required to display the setup information, a setup information display that displays the setup information concurrently with the guide display.

2. A setup information display device for a processing machine according to claim 1,
    wherein the display information generating means shows marks indicative of the types of tools that currently need to be set up, as the guide display, and the marks indicative of the types of tools that currently need to be set up are classified for display according to urgency level of the setup.

3. A setup information display device for a processing machine according to claim 2,
    wherein the display information generating means simultaneously shows up to a predetermined maximum number of marks indicative of tools that currently need to be set up, as the guide display, and tools corresponding to an excess of the predetermined maximum number are displayed as the number of tools that need to be set up decreases as a result of execution of the setup, and in that the information display section is covered with a touch panel that allows information corresponding to a position touched with a human finger to be input.

4. A setup information display method for a processing machine in which a plurality of tools can be installed, comprising:
    generating setup information on the basis of a processing schedule and information on the tools installed in the processing machine;
    generating, in an information display section of a display device, a guide display that displays types of tools that currently need to be set up and respective urgencies of setup of the tools that currently need to be set up and that prompts an operator to perform an operation required to display the setup information, and
    generating, in response to the operator performing the operation required to display the setup information, a setup information display that displays the setup information concurrently with the guide display.

* * * * *